United States Patent
Ku et al.

(10) Patent No.: US 8,242,713 B2
(45) Date of Patent: *Aug. 14, 2012

(54) LED ILLUMINATION SYSTEM WITH A POWER SAVING FEATURE

(75) Inventors: Chin-Long Ku, Taipei Hsien (TW); Da-Peng Zhang, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, New Taipei (TW)

( * ) Notice: Subject to any disclaimer, the term of this patent is extended or adjusted under 35 U.S.C. 154(b) by 239 days.

This patent is subject to a terminal disclaimer.

(21) Appl. No.: 12/719,002

(22) Filed: Mar. 7, 2010

(65) Prior Publication Data

US 2011/0140637 A1 Jun. 16, 2011

(51) Int. Cl.
*G05F 1/00* (2006.01)

(52) U.S. Cl. ........ 315/307; 315/308; 315/291; 315/360; 340/309.16; 345/77; 345/82

(58) Field of Classification Search .................. 315/307, 315/308, 302, 360, 291, 294, 312; 340/309.16, 340/309.8, 309.9; 345/77, 82, 102
See application file for complete search history.

(56) References Cited

U.S. PATENT DOCUMENTS

| 4,368,408 | A  | * | 1/1983 | Marcus | 340/309.8 |
| 7,239,093 | B2 | * | 7/2007 | Hsieh | 315/291 |
| 2010/0097002 | A1 | * | 4/2010 | Shatford et al. | 315/210 |
| 2010/0277077 | A1 | * | 11/2010 | Pong et al. | 315/152 |
| 2011/0127929 | A1 | * | 6/2011 | Ku et al. | 315/307 |

* cited by examiner

*Primary Examiner* — Haiss Philogene
(74) *Attorney, Agent, or Firm* — Altis Law Group, Inc.

(57) ABSTRACT

An LED illumination system includes a control circuit having a timing unit, a control unit, a PWM signal generating unit and a micro-programmed control unit (MCU). The timing unit divides an operating period of an LED lamp into different time segments, and outputs clock signals. The control unit outputs different controlling signals corresponding to the clock signals to the PWM signal generating unit, which in turn generates different PWM signals with different duty cycles. A constant current circuit electrically connects the control circuit and outputs different electric currents to make the LED lamp emit light having different light intensities at the different time segments. The MCU is at an outside of the LED lamp and sets a program to control the timing unit, the control unit and the PWM signal generating unit.

8 Claims, 2 Drawing Sheets

LED ILLUMINATION SYSTEM WITH A POWER SAVING FEATURE

BACKGROUND

1. Technical Field

The present disclosure relates to LED (light emitting diode) illumination systems, and more particularly to an LED illumination system having a low energy consumption.

2. Description of Related Art

Compared with the conventional light sources, such as fluorescent lamp, halogen lamp and incandescent lamp, the LEDs have a higher electro-optical conversion efficiency. Thus, nowadays LED usage has been increased in popularity in various applications, particularly, the applications needing large power consumption, in order to reduce operation cost of these applications.

Road lamp is one type of lamps consuming a larger amount of power; thus, it is extremely desirable to replace the conventional road lamps with the LED road lamps. However, the LED road lamp always keeps a constant brightness all over the illumination period thereof, even in the late night. In fact, at the late night, a traffic flow is low, and thus it is unnecessary to provide such a high degree of brightness as that at early night. The LED lamp would still waste a large amount of power to maintain the constant brightness during its whole operation period.

It is thus desirable to provide an LED illumination system which can overcome the described limitations.

DETAILED DESCRIPTION

Figure 1:
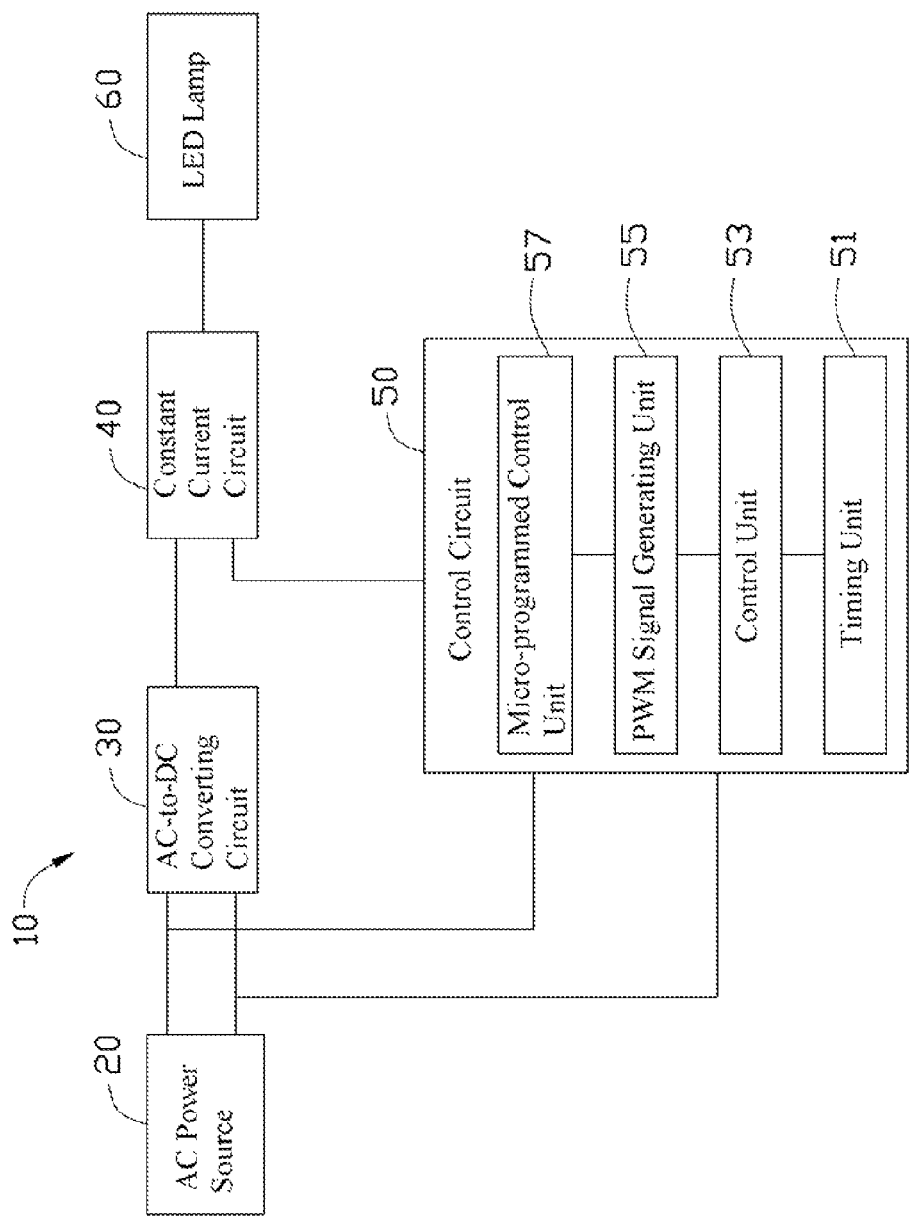
FIG. 1 is a block diagram illustrating an LED illumination system according to an embodiment of the present disclosure.

Referring to FIG. 1, an LED illumination system 10 according to an embodiment includes an AC power source 20, an AC-to-DC converting circuit 30, a constant current circuit 40, a control circuit 50 and an LED lamp 60. The control circuit 50 of the LED illumination system 10 is provided for controlling a brightness of the LED lamp 60 at different periods of time in use. In this embodiment, the LED lamp functions as a road lamp. Alternatively, the LED lamp 60 can be used in other application such as a park lamp or in a place which needs illumination during the whole night. The LED lamp 60 is electrically connected to the constant current circuit 40.

The AC-to-DC converting circuit 30 of the LED illumination system 10 has an input end electrically connected to the AC power source 20 and an output end electrically connected to the constant current circuit 40. The AC-to-DC converting circuit 30 receives AC power from the AC power source 20, then converts the AC power to DC power and finally outputs the DC power to the constant current circuit 40. The constant current circuit 40 includes a constant current source driving chip which can receive external PWM signals and supply different constant electric currents to the LED lamp 60 according to the PWM signals.

The control circuit 50 includes a timing unit 51, a control unit 53, a PWM signal generating unit 55 and a micro-programmed control unit (MCU) 57. The timing unit 51 is set to output clock signals to the control unit 53 at predetermined times during an operation of the LED lamp 60, thereby adjusting the brightness of the LED lamp 60 in different periods. In this embodiment, the timing unit 51 is timer. The timing unit 51 takes an operating period of the LED lamp 60 of one day as a cycle, and divides the cycle into a plurality of different time segments. The timing unit 51 is electrically connected with the AC power source 20. When the LED lamp 60 is in use, the timing unit 51 starts to count the operating time of the LED lamp 60 immediately, after the LED lamp 60 is turned on, and outputs a clock signal at a start of each of the time segment to the control unit 53. The control unit 53 is electrically connected with the PWM signal generating unit 55. The control unit 53 receives the clock signal from the timing unit 51 and outputs a control signal corresponding to the clock signal to the PWM signal generating unit 55, thereby controlling the PWM signal generating unit 55 to output a PWM signal which has a duty cycle corresponding to the control signal to the constant current circuit 40. In this embodiment, the control unit 53 is a central process unit (CPU) chip.

The MCU 57 is located at an outside of the LED lamp 60 and sets a program therein to control the timing unit 51, the control unit 53 and the PWM signal generating unit 55. The MCU 57 ensures the timing unit 51, the control unit 53 and the PWM signal generating unit 55 working as described above. The program of the MCU 57 may be changed to meet a different requirement for a different season regarding the different time segments. The different requirement for the different season can also include the brightness levels of the LED lamp at the different time segments.

Figure 2:
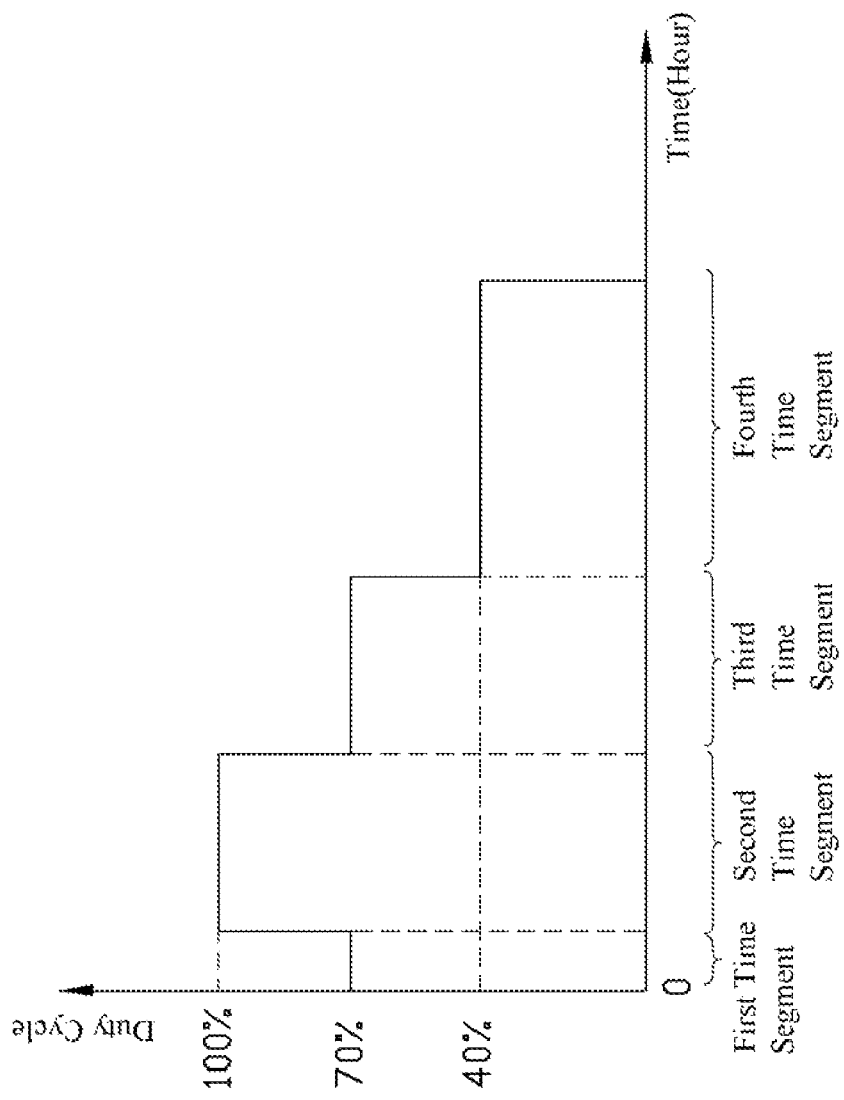
FIG. 2 is a diagram showing a multi-segments control curve achievable by the LED illumination system of FIG. 1 for controlling an LED lamp to illuminate with different brightness at different time segments according to an operation mode.

Supposing the LED lamp 60 needs to be continuously used for a long time in one cycle, the brightness levels of the LED lamp 60 at different times during the cycle is shown in FIG. 2. The timing unit 51 divides the cycle into four continuous time segments. A first time segment is a beginning time segment. In the first time segment an amount of a traffic flow is high and it is not totally dark outside. In a second time segment the amount of the traffic flow is still high and it is already totally dark outside. In a third time segment the amount of the traffic flow is relatively low. In a fourth time segment the amount of the traffic flow is the lowest.

When the LED lamp 60 is in use, the timing unit 51 starts to count the operating time of the LED lamp 60 immediately after the LED lamp 60 is turned on, and the PWM signal generating unit 55 starts to output a PWM signal which has 70% duty cycle to the constant current circuit 40. During the first time segment, the PWM signal generating unit 55 continuously supplies the PWM signal having 70% duty cycle to the constant current circuit 40 for driving the LED lamp 60 to emit with an initial brightness lower than full brightness. When the first time segment draws to an end, the timing unit 51 starts to output a second clock signal to the control unit 53. The control unit 53 receives the second clock signal and outputs a second control signal corresponding to the second clock signal to the PWM signal generating unit 55 to thereby control the PWM signal generating unit 55 to output a PWM signal which has 100% duty cycle to the constant current circuit 40. During the second time segment, the PWM signal generating unit continuously supplies the PWM signal which has 100% duty cycle to the constant current circuit 40 for driving the LED lamp 60 to emit with full brightness.

When the second time segment draws to an end, the timing unit 51 counts from zero again and the third time segment is start. Similarly, a third clock signal is outputted by the timing unit 51 to the control unit 53 at the end of the second time segment. The control unit 53 receives the third clock signal and outputs a third control signal corresponding to the third clock signal to the PWM signal generating unit 55. Then the PWM signal generating unit 55 outputs the PWM signal which has 70% duty cycle corresponding to the third control signal to the constant current circuit 40 again. Next, when the third time segment draws to an end, a fourth clock signal is outputted by the timing unit 51 to the control unit 53; the timing unit 51 counts from zero for a fourth time and the fourth time segment is start. The control unit 53 outputs a fourth control signal corresponding to the fourth clock signal to the PWM signal generating unit 55 to control the PWM signal generating unit 55 to output a PWM signal which has 40% duty cycle to the constant current circuit 40. When the fourth time segment is expired, the LED lamp 60 is turned off. Accordingly, the LED lamp 60 illuminates with different brightness at the different segments during operation under by control of the control circuit 50.

According to different seasons, the four time segments are different from each other. In spring, the first time segment is between 18:30~19:30, the second time segment is between 19:30~22:30, the third time segment is between 22:30~00:30, and the fourth time segment is between 00:30~05:30. In summer, the first time segment is between 19:30~20:30, the second time segment is between 20:30~22:30, the third time segment is between 22:30~00:30, and the fourth time segment is between 00:30~04:30. In autumn, the first time segment is between 18:30~20:30, the second time segment is between 20:30~22:30, the third time segment is between 22:30~00:30, and the fourth time segment is between 00:30~05:30. In winter, the first time segment is between 17:30~18:30, the second time segment is between 18:30~21:30, the third time segment is between 21:30~00:30, and the fourth time segment is between 00:30~06:30.

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED illumination system for emitting light with different light intensities at different times, comprising:
   an LED lamp;
   a control circuit comprising a timing unit, a control unit, a PWM signal generating unit, and a micro-programmed control unit, the timing unit dividing an operating period of the LED lamp into a plurality of different time segments, and outputting a clock signal at a start of each of the different time segments to the control unit, the control unit outputting different controlling signals corresponding to the clock signals to the PWM signal generating unit to cause the PWM signal generating unit to output different PWM signals which have different duty cycles at the different time segments, the micro-programmed control unit located out of the LED lamp and setting a program therein to control the timing unit, the control unit and the PWM signal generating unit; and
   a constant current circuit electrically connecting the control circuit to the LED lamp, the constant current circuit outputting different electric currents to the LED lamp according to the PWM signals, to control the LED lamp to emit light having different light intensities at the different time segments of the operating period.

2. The LED illumination system of claim 1, wherein the timing unit is a timer.

3. The LED illumination system of claim 1, wherein the control unit is a central process unit.

4. The LED illumination system of claim 1, wherein the program of the micro-programmed control unit is changed to meet a different requirement for a different season regarding the different time segments.

5. The LED illumination system of claim 4, wherein the different requirement for the different season includes the light intensities at the different time segments.

6. The LED illumination system of claim 1, wherein the different time segments for one of four seasons of a year are different from those of any other one of the four seasons of the year.

7. The LED illumination system of claim 1, wherein the LED lamp is a road lamp.

8. The LED illumination system of claim 1, further comprising an AC power source in electrical connection with the control circuit, and an AC-to-DC converting circuit electrically connected between the constant current circuit and the AC power source.

* * * * *